US012786520B2

(12) United States Patent
Baijal et al.

(10) Patent No.: US 12,786,520 B2
(45) Date of Patent: Nov. 3, 2026

(54) DISPLAY DEVICE AND CONTROLLING METHOD THEREOF

(71) Applicant: SAMSUNG ELECTRONICS CO., LTD., Suwon-si (KR)

(72) Inventors: Anant Baijal, Suwon-si (KR); Seungki Cho, Suwon-si (KR); Daeeun Hyun, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 60 days.

(21) Appl. No.: 18/891,688

(22) Filed: Sep. 20, 2024

(65) Prior Publication Data

US 2025/0016422 A1 Jan. 9, 2025

Related U.S. Application Data

(63) Continuation of application No. PCT/KR2023/002345, filed on Feb. 17, 2023.

(30) Foreign Application Priority Data

Mar. 21, 2022 (KR) ........................ 10-2022-0035037
May 26, 2022 (KR) ........................ 10-2022-0065008

(51) Int. Cl.
*H04N 21/4788* (2011.01)
*H04N 7/15* (2006.01)
(Continued)

(52) U.S. Cl.
CPC ......... *H04N 21/4788* (2013.01); *H04N 7/157* (2013.01); *H04N 21/4316* (2013.01); *H04N 21/4532* (2013.01)

(58) Field of Classification Search
None
See application file for complete search history.

(56) References Cited

U.S. PATENT DOCUMENTS 8,661,353 B2 2/2014 Mattingly et al.
8,806,354 B1 8/2014 Hyndman et al.
(Continued)

FOREIGN PATENT DOCUMENTS

CN 113687720 A 11/2021
KR 10-2012-0031168 A 3/2012
(Continued)

OTHER PUBLICATIONS

International Search Report (PCT/ISA/210) issued on May 24, 2023 by the International Searching Authority in International Application No. PCT/KR2023/002345.
(Continued)

*Primary Examiner* — Raqiul A Choudhury
(74) *Attorney, Agent, or Firm* — Sughrue Mion, PLLC

(57) ABSTRACT

A display device includes a display, memory storing instructions; and at least one processor to control the display. The display device displays a virtual world image including a virtual display device. Based on the display device being in a first mode, the display device displays a first virtual world image including the virtual display device where content is displayed, and based on the first mode being changed to a second mode, the display device displays at least a portion of an area excluding the virtual display device in the first virtual world image through a first area of the display, and displays the content through a second area of the display.

15 Claims, 11 Drawing Sheets

(51) Int. Cl.
*H04N 21/431* (2011.01)
*H04N 21/45* (2011.01)

(56) References Cited

U.S. PATENT DOCUMENTS

| | | | |
|---|---|---|---|
| 9,110,929 B2 | 8/2015 | Garcia et al. | |
| 9,338,200 B2 | 5/2016 | Park et al. | |
| 9,424,688 B2 | 8/2016 | Maaradji et al. | |
| 9,532,104 B2 | 12/2016 | Im et al. | |
| 10,068,374 B2 | 9/2018 | Miller et al. | |
| 10,257,554 B2 | 4/2019 | Marlow et al. | |
| 2009/0174732 A1 | 7/2009 | Lee et al. | |
| 2010/0306671 A1* | 12/2010 | Mattingly | G06F 3/0482 715/834 |
| 2011/0246908 A1* | 10/2011 | Akram | H04N 7/157 715/752 |
| 2012/0290966 A1* | 11/2012 | Chae | G06F 3/0481 715/778 |
| 2013/0291025 A1* | 10/2013 | Ozawa | H04N 13/178 725/61 |
| 2018/0293803 A1 | 10/2018 | Mao | |
| 2018/0367843 A1* | 12/2018 | Han | H04N 21/41407 |
| 2020/0177934 A1* | 6/2020 | Park | H04N 21/41265 |
| 2021/0304629 A1 | 9/2021 | Barron et al. | |
| 2022/0060792 A1* | 2/2022 | Kim | H04N 21/44008 |
| 2022/0156029 A1 | 5/2022 | Lee et al. | |

FOREIGN PATENT DOCUMENTS

| | | |
|---|---|---|
| KR | 10-1253213 B1 | 4/2013 |
| KR | 10-1518224 B1 | 5/2015 |
| KR | 10-2015-0126938 A | 11/2015 |
| KR | 10-1923723 B1 | 11/2018 |
| KR | 10-2022-0017193 A | 2/2022 |
| KR | 10-2536425 B1 | 5/2023 |
| KR | 10-2023-0112175 A | 7/2023 |

OTHER PUBLICATIONS

Written Opinion (PCT/ISA/237) issued on May 24, 2023 by the International Searching Authority in International Application No. PCT/KR2023/002345.
Communication dated Apr. 3, 2026 issued by the Korean Ministry of Intellectual Property in Korean Patent Application No. 10-2022-0065008.

* cited by examiner

DISPLAY DEVICE AND CONTROLLING METHOD THEREOF

CROSS REFERENCE TO RELATED APPLICATIONS

This application is a bypass continuation application of International Application No. PCT/KR2023/002345, filed on Feb. 17, 2023, which is based on and claims priority to Korean Patent Application No. 10-2022-0035037, filed on Mar. 21, 2022, in the Korean Patent Office, and Korean Patent Application No. 10-2022-0065008, filed on May 26, 2022, in the Korean Patent Office, the disclosures of which are incorporated by reference herein in their entireties.

BACKGROUND

1. Field

The present disclosure relates to a display device and a controlling method thereof and more particularly, to a display device that displays a virtual world image and a controlling method thereof.

2. Description of Related Art

With the development of electronic technology, techniques for providing various user experiences have been developed. For example, recently, when a viewing content together function is enabled, as shown on the left side of FIG. 1, first viewers may view a first TV in a living room while second viewers view a second TV in a different space, and a screen capturing the second viewers may be displayed on one side of the first TV as shown on the right side of FIG. 1. Here, the first and second viewers can view the same content and see each other's footage, providing the impression that they are viewing the same content in the same space, even though they are physically in different spaces.

This co-viewing of content can also be applied to virtual world services. For example, a user may wear a head mounted display (HMD) device or the like that provides a virtual world service and view content with a friend in a virtual world through a virtual display (VD) device. Here, the virtual world, may also be referred to as a metaverse, a virtual three-dimensional (3D) world or a digital world, which means a 3D virtual world where social, economic, and cultural activities as in the real world take place.

Specifically, the virtual world means a 3D virtual environment that resembles a real-world environment, which is created through computer graphics (CG) technology, where users can immerse themselves as players in a virtually created world through the interaction of the human body's senses (e.g., sight, hearing, smell, taste, touch) in the v However, the co-viewing of content targeted for the virtual world was only available through HMD devices, not through real-world display (real display, RD) devices.

In addition, even if the co-viewing of content targeted for the virtual world is provided through a real-world display device, separate UI, UX, and interaction methods need to be developed because the virtual world content is different from the existing content, and the HMD devices are different from the real-world display devices.

SUMMARY

Disclosed is a display device that provides a content co-viewing function for virtual world content through a real-world display device and a controlling method thereof.

According to an aspect of the disclosure, there is provided a display device including a display; memory storing instructions; and at least one processor configured to control the display to display a virtual world image including a virtual display device, wherein the instructions, when executed by the at least one processor, may cause the display device to: based on the display device being in a first mode, control the display to display a first virtual world image including the virtual display device where content is displayed; and based on the first mode being changed to a second mode, control the display to display at least a portion of an area excluding the virtual display device in the first virtual world image through a first area of the display, and to display the content through a second area of the display.

The instructions, when executed by the at least one processor, may cause the display device to: control the display to display only a partial area of an entire area corresponding to the virtual display device based on a first user manipulation; and based on a ratio of the partial area to the entire area being less than a threshold ratio, change the first mode to the second mode.

The first virtual world image further includes a first avatar corresponding to a user of the display device and at least one second avatar corresponding to at least one other user viewing the content with the user, and wherein the instructions, when executed by the at least one processor, may cause the display device to, based on the first mode being changed to the second mode, control the display to display the first avatar and the at least one second avatar through the first area, and to display the content through the second area.

The instructions, when executed by the at least one processor, may cause the display device to change a shape of the first avatar based on at least one of a remote control signal, a user voice, a keyboard input, or a user gesture.

The instructions, when executed by the at least one processor, may cause the display device to, based on the first mode being changed to a third mode, control the display to display the first virtual world image through a third area of the display, and to display other content through a fourth area of the display.

The first virtual world image further includes a first avatar corresponding to a user of the display device and at least one second avatar corresponding to at least one other user viewing the content with the user, and wherein the instructions, when executed by the at least one processor, may cause the display device to control the display to display a third avatar corresponding to an additional user viewing the content or the other content with the user, or at least one of photographing images of the additional user through a fifth area of the display, and to display a chat icon for conducting a chat with the at least one other user or the additional user through a sixth area of the display.

The display device may further include a communication interface, wherein the instructions, when executed by the at least one processor, may cause the display device to: receive streaming data through the communication interface; obtain the content from the streaming data; and render the first virtual world image including the virtual display device where the content is displayed.

The display device may further include a communication interface, wherein the instructions, when executed by the at least one processor, may cause the display device to: based on the display device being in the first mode, receive the first virtual world image from a server through the communication interface, and control the display to display the received first virtual world image.

The instructions, when executed by the at least one processor, may cause the display device to: based on the first mode being changed to the second mode, control the communication interface to transmit a signal requesting information about the content to the server; based on the information about the content being received through the communication interface, receive streaming data based on the received information; and obtain the content from the streaming data.

The instructions, when executed by the at least one processor, may cause the display device to: based on a user command for viewing the content with other user being received while the content is displayed through the display, provide information for sharing the content to a predetermined user terminal; and based on information about the other user being received, control the display to display the first virtual world image including a first avatar corresponding to a user of the display device, a second avatar corresponding to the other user, and the virtual display device.

The predetermined user terminal includes at least one of a user terminal connected to the same communication network as the display device or a prestored user terminal.

According to an aspect of the disclosure, there is provided a controlling method including: based on the display device being in a first mode, displaying a first virtual world image including a virtual display device where content is displayed; and based on the first mode being changed to a second mode, displaying at least a portion of an area excluding the virtual display device in the first virtual world image through a first area of the display, and displaying the content through a second area of the display.

The controlling method may further include displaying only a partial area of an entire area corresponding to the virtual display device based on a first user manipulation; and based on a ratio of the partial area to the entire area being less than a threshold ratio, changing the first mode to the second mode.

The first virtual world image further includes a first avatar corresponding to a user of the display device and at least one second avatar corresponding to at least one other user viewing the content with the user; and wherein the displaying the content through the second area of the display comprises, based on the first mode being changed to the second mode, displaying the first avatar and the at least one second avatar through the first area, and displaying the content through the second area.

The controlling method may further include changing a shape of the first avatar based on at least one of a remote control signal, a user voice, a keyboard input, or a user gesture.

According to one or more embodiments of the present disclosure as described above, the display device displays a virtual world image including a virtual display device, and when the mode is changed, the content displayed on the virtual display device is displayed in a separate area from the virtual world image, thereby preventing interference with the user's content viewing.

When the content co-viewing function is executed while the content is displayed, the display device displays a virtual world image including a virtual display device where a plurality of avatars corresponding to the user and other users and the content are displayed, providing the impression that the user is viewing the same content in the same space with other users.

BRIEF DESCRIPTION OF THE DRAWINGS

The above and other aspects and/or features of one or more embodiments of the present disclosure will be more apparent from the following description taken in conjunction with the accompanying drawings, in which.

DETAILED DESCRIPTION

Below, the disclosure is described in detail with reference to the accompanying drawings.

General terms that are currently widely used are selected as the terms used in embodiments of the disclosure in consideration of their functions in the disclosure, and may be changed based on the intention of those skilled in the art or a judicial precedent, the emergence of a new technique, or the like. In addition, in a specific case, terms arbitrarily chosen by an applicant may exist. In this case, the meanings of such terms are mentioned in detail in corresponding descriptions of the disclosure. Therefore, the terms used in the embodiments of the disclosure may be defined on the basis of the meanings of the terms and the contents throughout the disclosure rather than simple names of the terms.

In the disclosure, the expression "have", "may have", "include", "may include" or the like, indicates the existence of a corresponding feature (for example, a numerical value, a function, an operation or a component such as a part), and does not exclude the existence of an additional feature.

The expression "at least one of A and/or B" should be understood to refer to one of "A", "B" or "A and B".

In the disclosure, the expressions "1st," "2nd," "first," or "second," and the like may refer to various components, in any order and/or order of importance, and are used to distinguish one component from another and are not intended to limit such components.

Expressions in the singular include the plural unless the context clearly indicates otherwise. In this application, the terms "comprising" or "consisting of" and the like are intended to designate the presence of the features, numbers, steps, operations, components, parts, or combinations thereof described in the specification, and are not to be understood as precluding the possibility of the presence or addition of one or more other features, numbers, steps, operations, components, parts, or combinations thereof.

In the disclosure, the term "user" may refer to a person using an electronic apparatus or a device using an electronic apparatus (e.g., an artificial intelligence electronic apparatus).

Hereinafter, various embodiments of the present disclosure will be described in greater detail with reference to the accompanying drawings.

Figure 1:
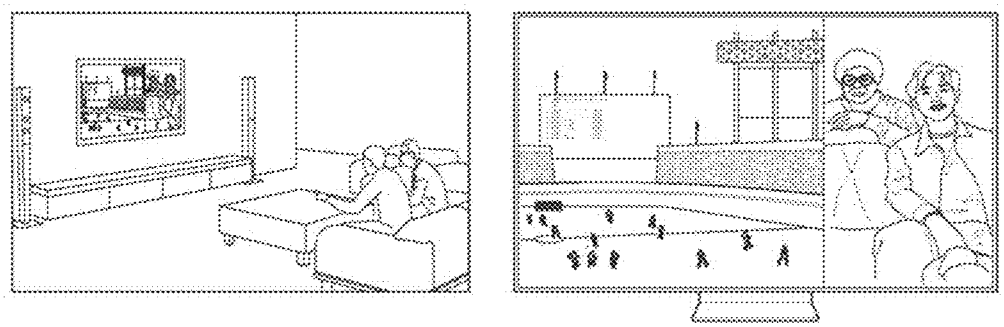
FIG. 1 is a view provided to illustrate related art displays.
Figure 2:
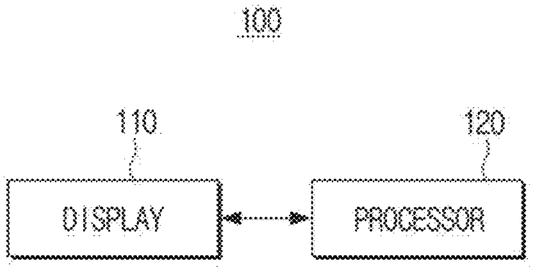
FIG. 2 is a block diagram illustrating a configuration of a display device according to an embodiment.

FIG. 2 is a block diagram illustrating configuration of a display device 100 according to an embodiment.

The display device 100 is a device that displays an image, and may be television, desktop PC, laptop, video wall, large format display (LFD), digital signage, digital information display (DID), projector display, digital video disk (DVD) player, refrigerator, washing machine, smartphone, tablet PC, monitor, smart glasses, smart view, or the like, and may be any device capable of displaying an input image.

Referring to FIG. 2, the display device 100 includes a display 110 and a processor 120.

The display 110 is configured to display an image, which can be implemented as various types of displays such as liquid crystal displays (LCDs), organic light emitting diodes (OLEDs) displays, plasma display panels (PDPs), and the like. The display 110 may also include drive circuitry, backlight units, and the like, which may be implemented in the form of a-si TFTs, low temperature poly silicon (LTPS) TFTs, organic TFTs (OTFTs), and the like. Meanwhile, the display 110 may be implemented as a touch screen combined with a touch sensor, a flexible display, a three-dimensional (3D) display, and the like.

The processor 120 controls the overall operations of the display device 100. Specifically, the processor 120 may be connected to each configuration of the display device 100 to control the overall operations of display device 100. For example, the processor 120 may be connected to configurations such as the display 110, a communication interface, a memory, and the like to control the operations of the display device 100.

According to an embodiment, the processor 120 may be implemented as a digital signal processor (DSP), a microprocessor, or a Time controller (TCON). However, the processor 120 is not limited thereto, and may include one or more of a central processing unit (CPU), a Micro Controller Unit (MCU), a micro processing unit (MPU), a controller, an application processor (AP) or a communication processor (CP), or an advanced RISC machine (ARM) processor, or may be defined by the corresponding term. In addition, the processor 120 may be implemented in a system-on-chip (SoC) or a large scale integration (LSI) in which a processing algorithm is embedded, or may be implemented in the form of a field programmable gate array (FPGA).

The processor 120 may be implemented as a plurality of processors. However, hereinafter, for convenience of explanation, the processor 120 will be used to describe the operations of the display device 100.

The processor 120 may control the display 110 to display a virtual world image including a virtual display device. For example, the processor 120 may control the display 110 to display a first virtual world image that includes a virtual display device that displays content when the display device 100 is in a first mode.

Here, the processor 120 may receive streaming data through the communication interface, obtain content from the streaming data, and render a first virtual world image that includes a virtual display device on which the content is displayed. In this case, the display device 100 may render the virtual world image directly.

Alternatively, the processor 120 may receive the first virtual world image from a server through the communication interface when the display device 100 is in the first mode, and control the display 110 to display the received first virtual world image. In this case, the server may render the virtual world image directly, and the display device 100 may receive the virtual world image rendered by the server and display the received virtual world image.

When the mode is changed from from the first mode to the second mode, the processor 120 may control the display 110 to display at least a portion of an area excluding the virtual display device in the first virtual world image through a first area of the display 110, and to display the content through a second area of the display 110. This operation is referred to below as popping out of the content.

Here, the processor 120 may control the display 110 to display only a portion of the entire area corresponding to the virtual display device based on a first user manipulation, and may change the first mode to the second mode if the ratio of the portion of the entire area to the entire area is less than a threshold ratio.

For example, when only a portion of the entire area corresponding to the virtual display device is displayed and the remaining portions are not displayed in response to the first user manipulation for changing the area that is displayed through the display 110 in the virtual world, the processor 120 may change the mode from the first mode to the second mode based on the size of the portion.

However, the present disclosure is not limited thereto, and the mode may be changed in various other ways. For example, the processor 120 may change the first mode to the second mode in response to a user command to change the mode. Alternatively, the processor 120 may change the first mode to the second mode when an avatar included in the virtual world moves and obscures the virtual display device by more than a threshold percentage. Alternatively, the processor 120 may change the first mode to the second mode when the number of pixels corresponding to the virtual display device decreases below a first threshold number in response to a user manipulation that zooms out the virtual world image. Alternatively, the processor 120 may change the first mode to the second mode when the number of pixels corresponding to the virtual display device increases above a second threshold number in response to a user manipulation that zooms in the virtual world image.

When the display device 100 performs rendering and the mode of the display device 100 is changed from the first mode to the second mode, the processor 120 may obtain content from the streaming data and render a virtual world image, and separately display the obtained content.

Alternatively, when the server performs rendering and the mode of the display device 100 is changed from the first mode to the second mode, the processor 120 may receive information about the content from the server, obtain the content from the received streaming data based on the information about the content, and display the obtained content.

In other words, when the mode of the display device 100 is changed from the first mode to the second mode, the processor 120 may obtain content through an operation such as decoding, and control the display 110 to display the obtained content itself on one area of the display 110. When the display device 100 is in the first mode, the processor 120 only obtains the virtual world image using the obtained content, but does not display the obtained content itself.

The first virtual world image further includes a first avatar corresponding to a user of the display device 100 and at least one second avatar corresponding to at least one other user who is viewing the content with the user, and the processor 120 may control the display 110 to display the first avatar and the at least one second avatar through the first area and the content through the second area when the mode of the first mode is changed from the first mode to the second mode.

Here, the processor 120 may change the shape of the first avatar based on at least one of a remote control signal, a user voice, a keyboard input, or a user gesture. For example, the processor 120 may identify the user's body, pose, face, etc. from a series of images of the user captured through a camera, and control the first avatar based on the identified information.

In addition, when control information about the second avatar is received from the other user's electronic device through the communication interface, the processor 120 may change the shape of the second avatar based on the received control information.

When the mode is changed from the first mode to the third mode, the processor may control the display to display the first virtual image through a third area of the display 110 and display other content through a fourth area of the display 110. In this case, as the mode is changed to the third mode, the processor 120 may control the display 110 to display a UI that inquires about whether to output the sound of either one of the content or other content.

The first virtual world image further includes a first avatar corresponding to a user of the display device 100 and at least one second avatar corresponding to at least one additional user who is viewing the content with the user, and the processor 120 may control the display 110 to display, through a fifth area of the display 110, at least one of a third avatar corresponding to an additional user who is viewing the content or other content with the user, or a photographed image of the additional user, and to display, through a sixth area of the display 110, a chat icon for conducting a chat with the other user or the additional user. Here, the additional user who is viewing the other content is not sharing the virtual world, so the photographed image of the additional user may be displayed, or the third avatar may be displayed under the control of the additional user.

Meanwhile, when a user command to view content with other user is received while the content is displayed through the display 110, the processor 120 may provide information for sharing the content to a predetermined user terminal, and when information about the other user is received, the processor 120 may control the display 110 to display the second avatar corresponding to the other user and the first virtual world image including the virtual display device. Here, the predetermined user terminal may include at least one of a user terminal connected to the same communication network as the display device 100 or a prestored user terminal.

For example, when a user command to view content with other user is received while the content is displayed through the display 110, the processor 120 may provide a link for sharing the content to a user terminal connected to the same communication network as the display device 100. The user may provide the link to a terminal of the other user through a messenger installed on the user terminal. When the other user accesses the link, the processor 120 may receive information about the other user. Upon receiving the information about the other user, the processor 120 may control the display 110 to display the first virtual world image including the first avatar corresponding to the user of the display device 100, the second avatar corresponding to the other user, and the virtual display device.

Meanwhile, while the server renders the virtual world image and the display device 100 displays the virtual world image received from the server, the processor 120 may control the communication interface to transmit a signal requesting information about the content to the server when the first mode is changed to the second mode, and when the information about the content is received through the communication interface, the processor 120 may receive streaming data based on the received information, obtain content from the streaming data, and control the display 110 to display at least a portion of an area excluding the virtual display device in the first virtual world image through the first area, and display the content through the second area.

Figure 3:
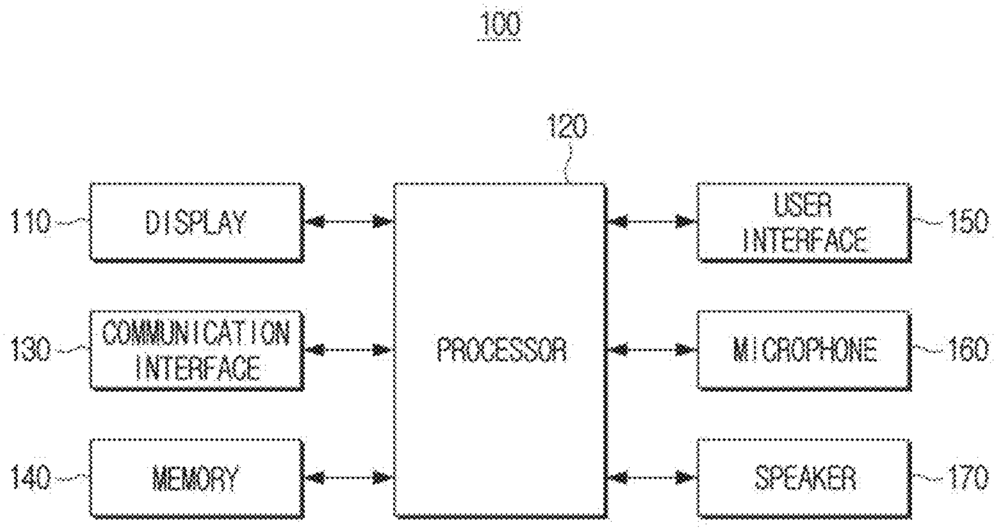
FIG. 3 is a block diagram illustrating a detailed configuration of a display device according to an embodiment.

FIG. 3 is a block diagram illustrating detailed configuration of the display device 100 according to an embodiment. The display device 100 may include the display 110 and the processor 120. In addition, referring to FIG. 3, the display device 100 may further include a communication interface 130, a memory 140, a user interface 150, a microphone 160, and a speaker 170. Some of the components shown in FIG. 3 are redundant with those shown in FIG. 2, so further description thereof will be omitted.

The communication interface 130 is configured to perform communication with various types of external devices according to various types of communication methods. For example, the display device 100 may perform communication with a server or a user terminal through the communication interface 130.

The communication interface 130 may include a Wi-Fi module, a Bluetooth module, an infrared communication module, a wireless communication module, and the like. Here, each communication module may be implemented in the form of at least one hardware chip.

The Wi-Fi module and the Bluetooth module perform communication using a Wi-Fi method and a Bluetooth method, respectively. When using a Wi-Fi module or a Bluetooth module, various connection information such as SSID and session keys are first transmitted and received, and various information can be transmitted and received after establishing a communication connection using the same. The infrared communication module performs communication according to an infrared Data Association (IrDA) communication technology which transmits data wirelessly over a short distance using infrared rays between optical light and millimeter waves.

In addition to the above-described communication methods, the wireless communication module may include at least one communication chip that performs communication according to various wireless communication standards, such as Zigbee, 3rd Generation (3G), 3rd Generation Partnership Project (3GPP), Long Term Evolution (LTE), LTE Advanced (LTE-A), 4th Generation (4G), 5th Generation (5G), etc.

Alternatively, the communication interface 130 may include a wired communication interface such as HDMI, DP, Thunderbolt, USB, RGB, D-SUB, DVI, etc.

In addition, the communication interface 130 may include at least one of a local area network (LAN) module, an Ethernet module, or a wired communication module that performs communication using pair cables, coaxial cables, or fiber optic cables.

The memory 140 may refer to hardware that stores information, such as data, in electrical or magnetic form for access by the processor 120 or the like. To this end, the memory 140 may be implemented as at least one of the following hardware: non-volatile memory, volatile memory, flash memory, hard disk drive (HDD) or solid state drive (SSD), RAM, ROM, etc.

The memory 140 may store at least one instruction or module required for the operation of the display device 100 or the processor 120. Here, the instruction is a code unit that directs the operation of the display device 100 or processor 120, and may be written in a machine language that can be understood by a computer. The module may be a set of instructions that perform a specific task of a unit of work.

The memory 140 may store data, which is information in bits or bytes that may represent characters, numbers, images, and the like. For example, the memory 140 may store at least one of content or a virtual world image.

The memory 140 may store a rendering module, a content module, an avatar generation module, an avatar control module, and the like.

The memory 140 is accessed by the processor 120, and reading/writing/modifying/deleting/updating instructions, modules, or data may be performed by the processor 120.

The user interface 150 may be implemented as a button, a touch pad, a mouse, a keyboard, etc., or may be implemented as a touch screen that can also perform a display function and a manipulation input function. Here, the button may be a various types of buttons such as a mechanical button, a touch pad, a wheel, etc. formed in any arbitrary area such as the front, side, or back.

The speaker 170 is configured to output various notification sounds or voice messages as well as various audio data processed by the processor 120.

The microphone 160 is configured to receive sound input and convert it into an audio signal. The microphone 160 is electrically connected to the processor 120, and may receive sound under the control of the processor 120.

For example, the microphone 160 may be integrally formed in the direction of the top, front, side, etc. of the display device 100. Alternatively, the microphone 160 may be formed on a remote controller, etc. that is separate from the display device 100. In this case, the remote controller may receive sound through the microphone 160, and provide the received sound to the display device 100.

The microphone 160 may include various components such as a microphone that collects analog sound, an amplification circuit that amplifies the collected sound, an A/D conversion circuit that samples the amplified sound and converts it into a digital signal, a filter circuit that removes noise components from the converted digital signal, etc.

Meanwhile, the microphone 160 may be implemented in the form of a sound sensor, and may be any configuration capable of collecting sound.

In addition, the display device 100 may further include a camera. The camera is configured to capture still images or moving images. The camera may capture still images at a specific point in time, but may also capture still images continuously.

The camera may photograph the front of the display device 100 to capture a user viewing the display device 100. The processor 120 may provide the image of the user captured by the camera to an electronic device of other user.

The camera includes a lens, a shutter, an aperture, a solid-state imaging device, an analog front end (AFE), and a timing generator (TG). The shutter controls the time when light reflected from a subject enters the camera, and the aperture controls the amount of light entering the lens by mechanically increasing or decreasing the size of the opening through which the light enters. When the light reflected from the subject is accumulated as a photoelectric charge, the solid-state imaging device outputs the photoelectric charge as an electrical signal. The TG outputs a timing signal to read out the pixel data of the solid-state imaging device and the AFE samples and digitizes the electrical signal output from the solid-state imaging device.

As described above, the display device 100 may display a virtual world image including a virtual display device, and when the mode is changed, may display the content displayed on the virtual display device 100 in a separate area from the virtual world image to prevent interference with the user's viewing of the content.

In addition, through the above-described operations, the display device 100 may provide a user with a new Device eXperience (DX) that bridges the real world and the virtual world.

Hereinafter, the operations of the display device 100 will be described in greater detail with reference to FIGS. 4 to 10. For convenience of explanation, individual embodiments are described in FIGS. 4 to 10. However, the individual embodiments of FIGS. 4 to 10 may be implemented in any combination.

Figure 4:
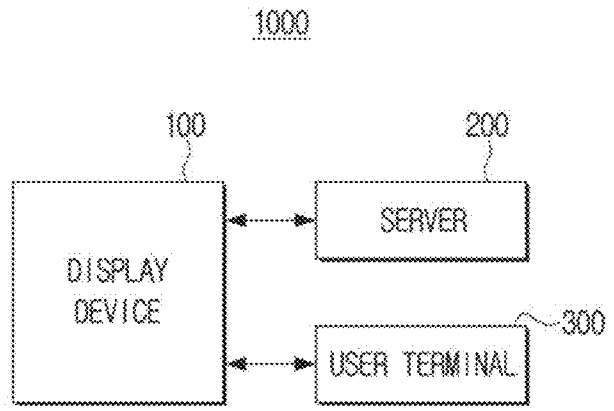
FIG. 4 is a block diagram provided to illustrate an electronic system according to an embodiment.

FIG. 4 is a block diagram provided to explain an electronic system 1000 according to an embodiment.

As shown in FIG. 4, the electronic system 1000 may include the display device 100, a server 200, and a user terminal 300.

The display device 100 may receive from the server 200 a virtual world image rendered by the server 200 and display the virtual world image. In addition, when the mode is changed, the display device 100 may display at least a portion of an area excluding the virtual display device in the virtual world image through a first area of the display 110 and display content through a second area of the display 110.

The server 200 may render a virtual world and provide the display device with an image of the virtual world that includes a portion of the virtual world based on the user's view of the display device 100.

In addition, when the mode of the display device 100 is changed, requiring information about the content, the server 200 may provide information about the content to the display device 100.

The user terminal 300 may be a device connected to the same communication network as the display device 100. Alternatively, the user terminal 300 may be a device prestored in the display device 100.

The user terminal 300 may receive a link for sharing content from the display device 100, and may transmit the link for sharing content to other user's electronic device in response to a user manipulation.

Meanwhile, in FIG. 4, the display device 100 and the server 200 are described as being separated, but the display device 100 and the server 200 are not limited thereto. For example, the display device 100 may perform a rendering operation of the server 200.

Figure 5:
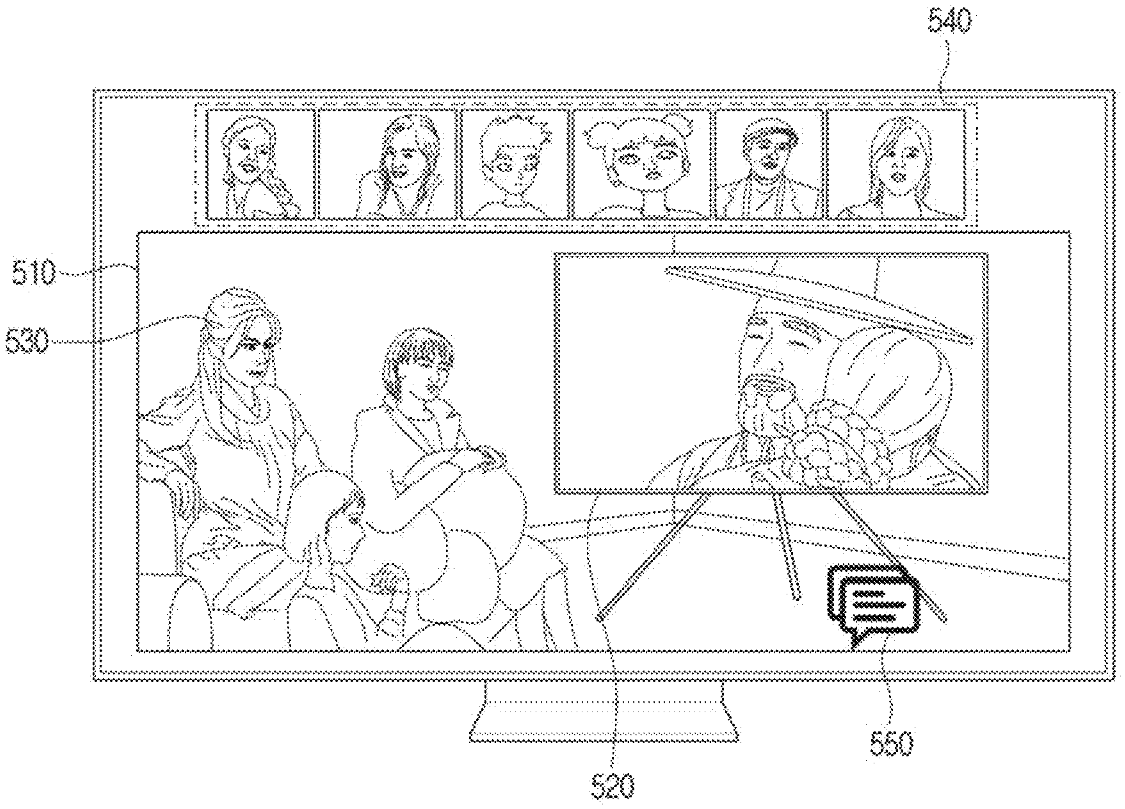
FIG. 5 is a view provided to illustrate an operation of displaying a virtual world image according to an embodiment.

FIG. 5 is a view provided to explain an operation of displaying a virtual world image according to an embodiment.

As shown in FIG. 5, the processor 120 may display, through the display 110, a virtual world image 510, an area 540 indicating information about a plurality of other users who are viewing the content with the user of the display device 100, and a chat icon for conducting a chat with the plurality of other users.

Here, the virtual world image 510 may include a first avatar 530 corresponding to the user of the display device 100, at least one second avatar corresponding to other user, and a virtual display device 520 where the content is displayed.

The area 540, which indicates information about the plurality of other users who are viewing the content with the user of the display device 100, may include information about other users other than the other user corresponding to the second avatar. For example, other users who are the same age as the user may be represented by the second avatar, and the remaining other users may be displayed in the area 540.

Figure 6:
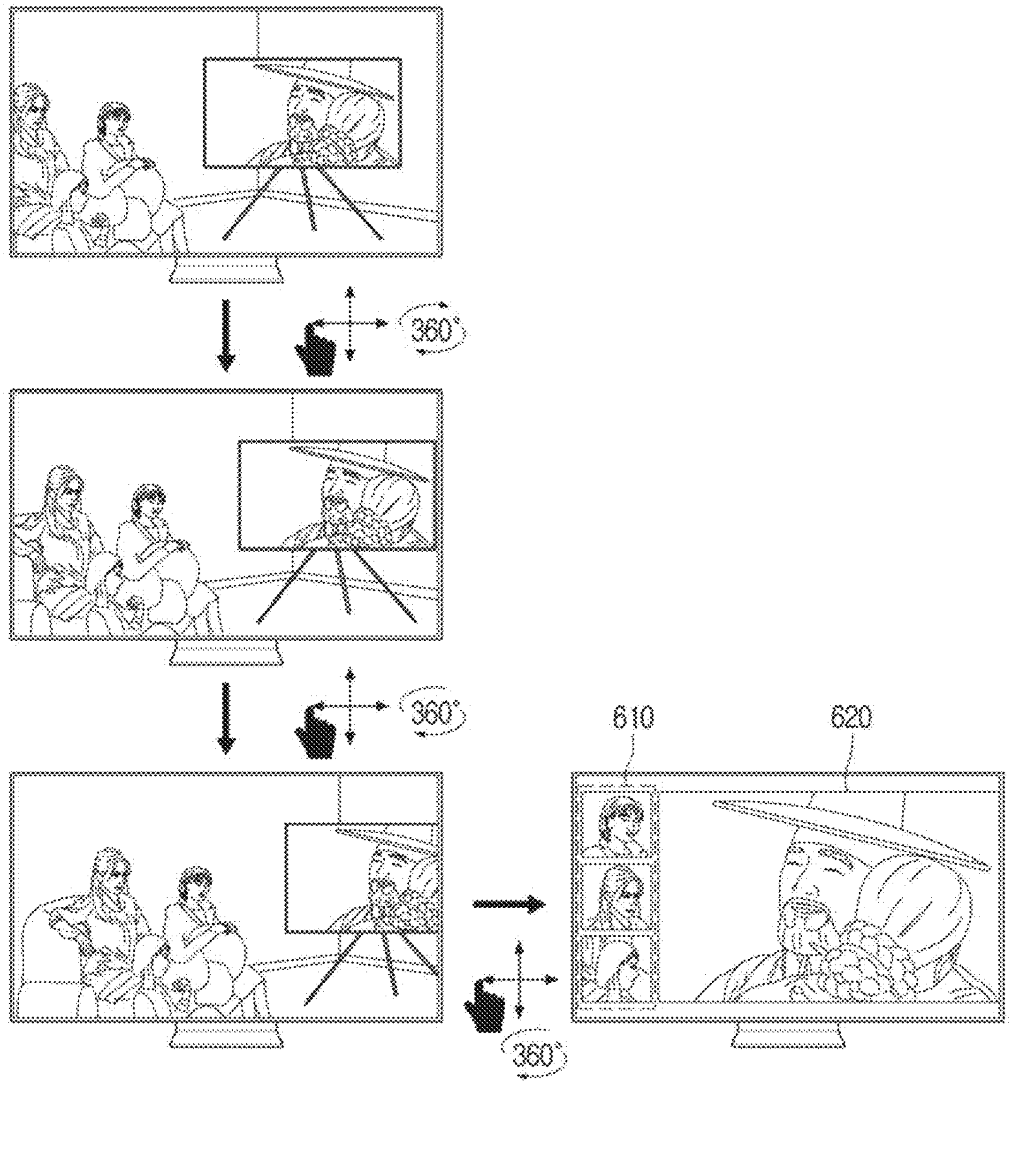
FIG. 6 is a view provided to illustrate a content pop-out operation according to an embodiment.

FIG. 6 is a view provided to explain a content pop-out operation according to an embodiment.

The processor 120 may change the area displayed through the display 110 in the virtual world in response to a user manipulation. For example, as shown on the left side of FIG. 6, when the displayed area shifts to the left side such that only a portion of the entire area corresponding to the virtual display device is displayed and the ratio of the portion of the area to the entire area is less than a threshold ratio, the processor 120 may change the mode of the display device 100 from the first mode to the second mode.

As shown on the right side of FIG. 6, when the first mode is changed to the second mode, the processor 120 may control the display 110 to crop the avatars in the virtual world image, and to display an image 610 including the cropped avatars through a first area of the display 110 and to display content 620 through a second area of the display 110.

Through the above-described operation, the entire area corresponding to the virtual display device is not displayed, thereby preventing interference with the user's content viewing. In addition, the user may keep exploring the virtual world.

Figure 7:
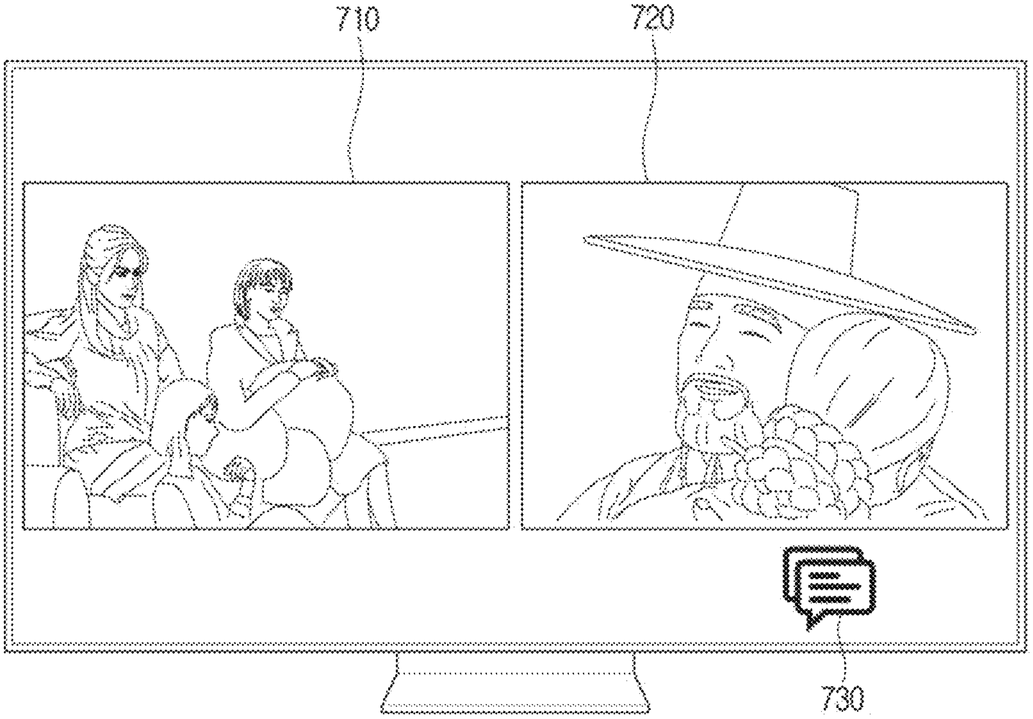
FIG. 7 is a view provided to illustrate a content pop-out operation according to another embodiment.

FIG. 7 is a view provided to explain a content pop-out operation according to another embodiment.

As shown in FIG. 7, when the first mode is changed to the second mode, the processor 120 may control the display 110 to crop the area including the avatars in the virtual world image, to display an area 710 including the cropped avatars through a first area of the display 110, and to display content 720 through a second area of the display 110. In addition, the processor 120 may control the display 110 to display a chat icon 730 for conducting a chat. Here, the first area of FIG. 7 may be larger than the first area of FIG. 6, and the second area of FIG. 7 may be smaller than the third area of FIG. 6. However, the present disclosure is not limited thereto, and the processor 120 may determine the size of the first area of FIG. 7 based on the position of the avatars in the virtual world image.

Through the above-described operation, the entire area corresponding to the virtual display device is not displayed, thereby preventing interference with the user's content viewing. In addition, the user may keep exploring the virtual world.

Figure 8:
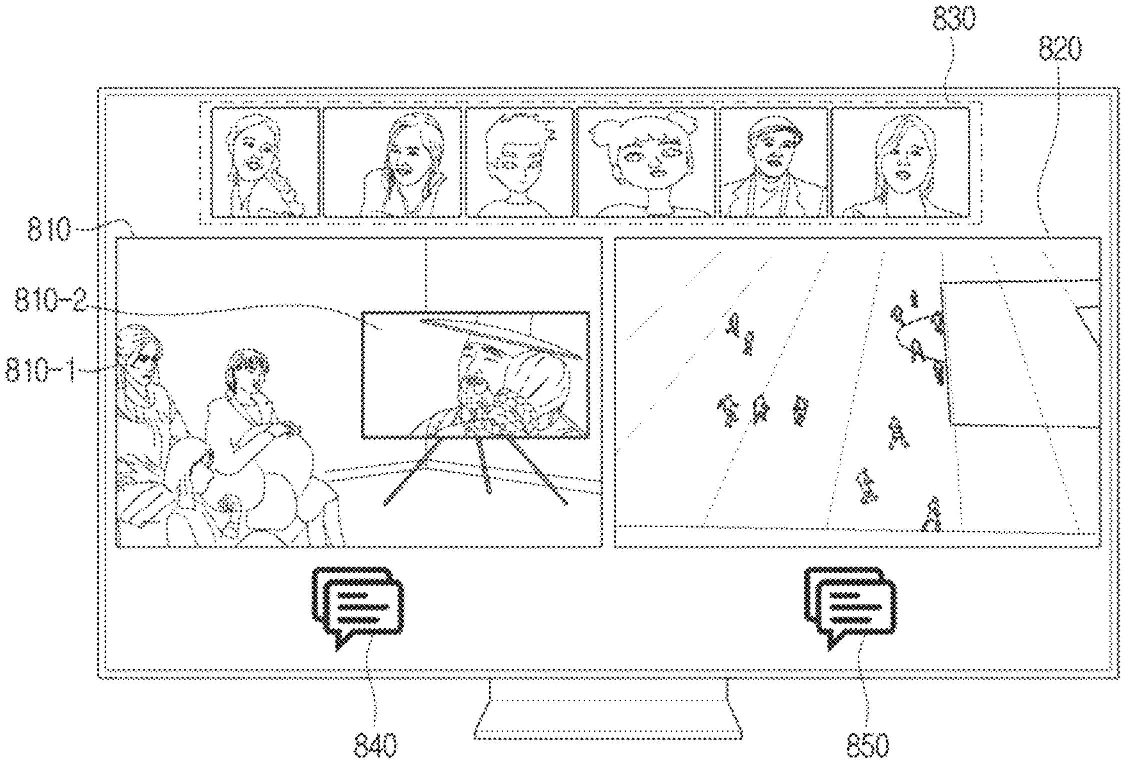
FIG. 8 is a view provided to illustrate an operation of content and other content according to an embodiment.

FIG. 8 is a view provided to explain an operation of content and other content according to an embodiment.

When the mode of the processor 120 is changed from the first mode to the third mode, the processor 120 may control the display 110 to display the first virtual world image through a third area of the display 110, and to display other content through a fourth area of the display 110.

For example, as shown in FIG. 8, when the first mode is changed to the third mode, the processor 120 may control the display 110 to display a first virtual world image 810 through the third area of the display 110, and to display other content 820 through the fourth area of the display 110. Here, the first virtual world image 810 may include a virtual display device 810-2 and avatars 810-1 corresponding to a plurality of users who are viewing together the content displayed by the virtual display device 810-2.

Meanwhile, the processor 120 may change the mode of the display device 100 from the first mode to the third mode when a user command to further display other content is received from the user.

The first virtual world image 810 may further include a first avatar 810-1 corresponding to the user of the display device 100, at least one second avatar corresponding to at least one other user who is viewing the content with the user, and a virtual display device 810-2.

As shown in FIG. 8, the processor 120 may control the display 110 to display at least one of a third avatar corresponding to an additional user viewing the content or other content with the user, or a photographed image of the additional user through a fifth area 830 of the display 110, and to display chat icons 840, 850 for conducting a chat with the other user or the additional user through a sixth area of the display 110.

The user may block co-viewing by selecting any one of the areas in the fifth area 830. For example, when a user command to touch one of the avatars included in the fifth area 830 is received, the processor 120 may not provide the virtual world image to the electronic device to the additional user corresponding to the user command.

Alternatively, the user may mute sound by selecting any one of the areas in the fifth area 830. For example, when a user command to touch any one of the avatars included in the fifth area 830 is received, the processor 120 may mute any sound received from the electronic device of the additional user corresponding to the user command.

Through the above-described operation, the utilization of the user's display device 100 can be increased.

Figure 9:
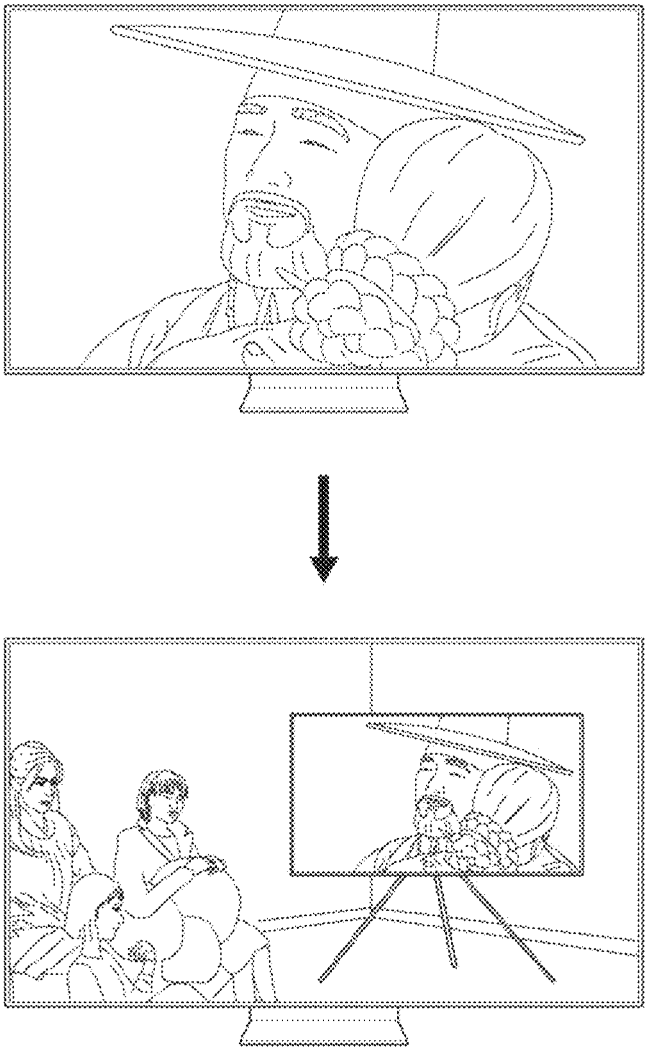
FIG. 9 is a view provided to illustrate entry into a first mode of a display device according to an embodiment.

FIG. 9 is a view provided to explain entry into a first mode of the display device 100 according to an embodiment.

When a user command to select content is received, the processor 120 may display the content through the display 110, as shown in the upper portion of FIG. 9.

When a user command for viewing content with other user is received while the content is displayed through the display 110, the processor 120 may provide information for sharing the content to a predetermined user terminal, and when information about other user is received, the processor 120 may control the display 110 to display a first virtual world image including a first avatar corresponding to the user of the display device 100, a second avatar corresponding to the other user, and a virtual display device, as shown in the lower portion of FIG. 9. In addition, the processor 120 may provide the first virtual world image to an electronic device of the other user. Here, the predetermined user terminal may include at least one of a user terminal connected to the same communication network as the display device 100 or a prestored user terminal.

Here, the user's HMD device may display content displayed on the virtual display device. However, the present disclosure is not limited thereto, and the user's HMD device may also display an image of the first virtual world displayed on the display device 100.

Meanwhile, FIG. 9 describes that operation as shown in the lower portion of FIG. 9 is performed when information about other user is received, but the present disclosure is not limited thereto. For example, when a user command for viewing the content with other user is received while the content is displayed through the display 110, the processor 120 may control the display 110 to display a first virtual world image including a first avatar corresponding to the user of the display device 100 and a virtual display device upon. At the same time, the processor 120 may provide information for sharing the content to a predetermined user terminal and, when information about the other user is received, may add a second avatar corresponding to the other user to the first virtual world image.

Meanwhile, the user may input a user command to view the content with other user and set various properties. For example, the user may set the size, position, visibility adjustment, video quality, audio quality, etc. of a plurality of windows. In addition, the user may set themes and purchase themes from a marketplace. The user may also set the appearance, accessories, etc. of his or her avatar.

Figure 10:
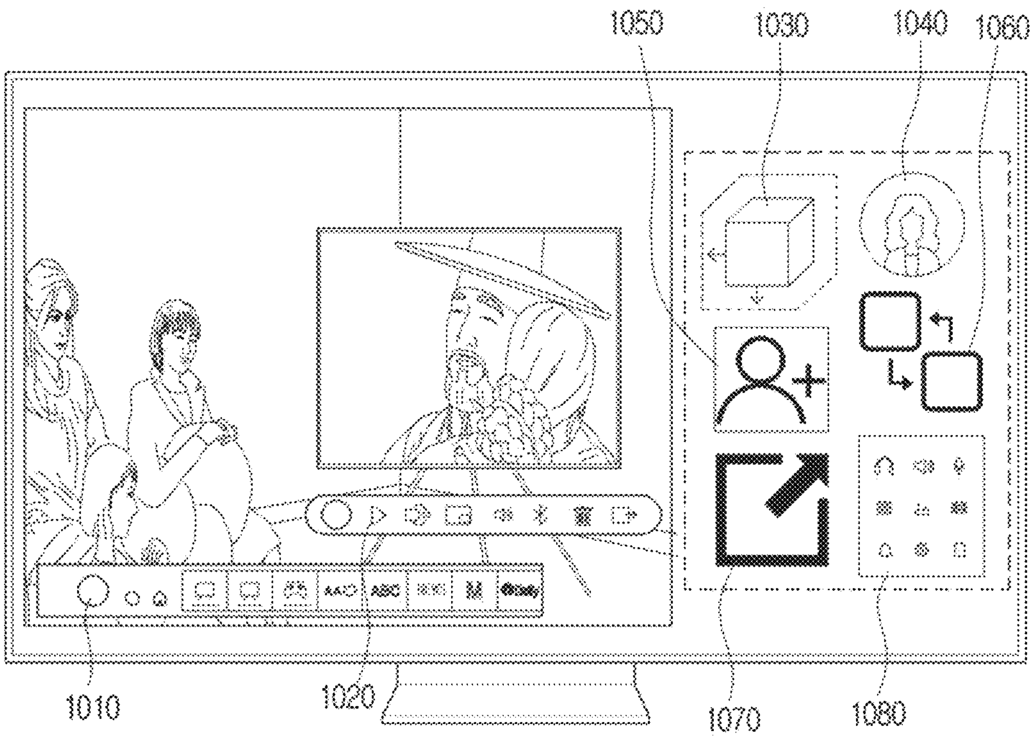
FIG. 10 is a view provided to illustrate various setting functions according to an embodiment.

FIG. 10 is a view provided to explain various setting functions according to an embodiment.

As shown in FIG. 10, the processor 120 may display various icons. For example, when a user command to touch a first icon 1010 is received, the processor 120 may change at least one of the window style, number of windows, or information displayed in the window. Alternatively, when a user command to touch a second icon 1020 is received, the processor 120 may change the settings of the window.

When a user command to touch a third icon 1030 is received, the processor 120 may display a page for changing the theme or purchasing a theme. When a user command to touch a fourth icon 1040 is received, the processor 120 may display a page for customizing an avatar. When a user command to touch a fifth icon 1050 is received, the processor 120 may invite other users, and when a user command to touch a sixth icon 1060 is received, the processor 120 may change modes. When a user command to touch a seventh icon 1070 is received, the processor 120 may pop out content that is displayed on the virtual display device, and when a user command to touch an eighth icon 1080 is received, the processor 120 may display a page for controlling the content.

Figure 11:
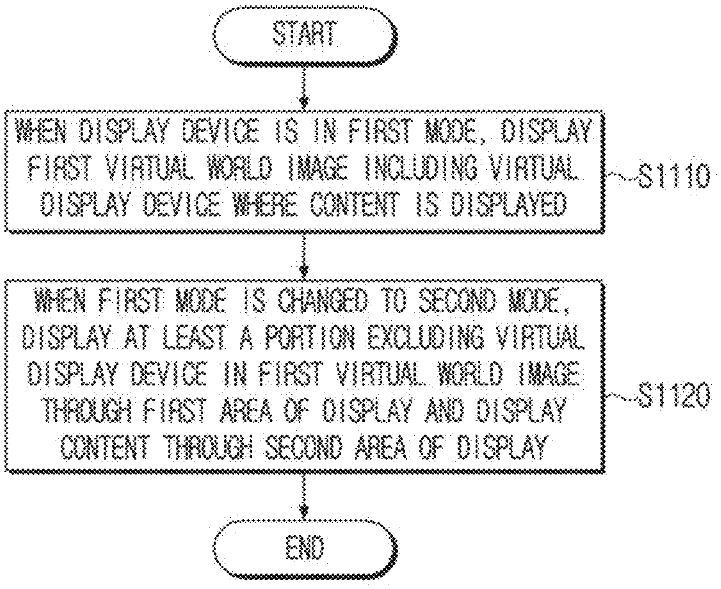
FIG. 11 is a flowchart provided to illustrate a controlling method of a display device according to an embodiment.

FIG. 11 is a flowchart provided to explain a controlling method of a display device according to an embodiment.

Firstly, when the display device is in a first mode, the display device displays a first virtual world image including a virtual display device in which content is displayed (S1110). When the first mode is changed to the second mode, at least a portion of an area excluding the virtual display device in the first virtual world image is displayed through a first area of a display included in the display device, and the content is displayed through a second area of the display (S1120).

The method may further include displaying only a portion of the entire area corresponding to the virtual display device based on a first user manipulation, and changing the first mode to the second mode when the ratio of the portion of the entire area to the entire area is less than a threshold ratio.

In addition, the first virtual world image may further include a first avatar corresponding to the user of the display device and at least one second avatar corresponding to at least one other user who is viewing the content with the user, and the step of displaying the content through a second area of the display (S1120) may include displaying the first avatar and the at least one second avatar through a first area and displaying the content through a second area when the first mode is changed to the second mode.

The method may further include changing the shape of the first avatar based on at least one of a remote control signal, a user voice, a keyboard input, or a user gesture.

Meanwhile, the method may further include, when the first mode is changed to the third mode, displaying the first virtual world image through a third area of the display and displaying other content through a fourth area of the display.

Here, the first virtual world image may further include a first avatar corresponding to the user of the display device and at least one second avatar corresponding to at least one other user who is viewing the content with the user, and the controlling method may further include displaying at least one of a third avatar corresponding to an additional user who is viewing the content or other content with the user or a photographed image of the additional user through a fifth area of the display, and displaying a chat icon for conducting a chat with the other user or the additional user through a sixth area of the display.

Meanwhile, the method may further include receiving streaming data, obtaining content from the streaming data, and rendering a first virtual world image including a virtual display device where the content is displayed.

The method may further include, when the display device is in the first mode, receiving the first virtual world image from a server.

Here, the step of displaying the content through the second area of the display (S1120) may include transmitting a signal requesting information about the content to the server when the first mode changes to the second mode, when the information about the content is received, receiving streaming data based on the received information, and obtaining the content from the streaming data.

Meanwhile, the method may further include, when a user command to view the content with other user is received while the content is displayed through the display, providing information for sharing the content to a predetermined user terminal, and the step of displaying the content through the second area of the display (S1120) may include, when information about the other user is received, displaying the first virtual world image including the first avatar corresponding to the user of the display device, the second avatar corresponding to the other user, and the virtual display device.

In addition, the predetermined user terminal may include at least one of a user terminal connected to the same communication network as the display device or a prestored user terminal.

According to the above-described various embodiments of the present disclosure, the display device may display a virtual world image including a virtual display device, and when the mode is changed, the content displayed on the virtual display device may be displayed in a separate area from the virtual world image, thereby preventing interference with the user's viewing of the content.

In addition, when a content co-viewing function is executed while the content is displayed, a virtual world image including a virtual display device displaying a plurality of avatars corresponding to the user and other user and the content is displayed, providing the user with the impression that he or she is viewing the same content with the other user in the same space.

Meanwhile, according to an embodiment, the above-described various embodiments may be implemented in software including an instruction stored in a machine-readable storage medium that can be read by a machine (e.g., a computer). The machine may be a device that invokes the stored instruction from the storage medium and be operated based on the invoked instruction, and may include a drying device (e.g., drying device (A)) according to embodiments. In case that the instruction is executed by the processor, the processor may directly perform a function corresponding to the instruction using other components under the control of the processor. The instruction may include codes generated or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

Further, according to an embodiment of the present disclosure, methods according to various embodiments described above may be provided in a computer program product. The computer program product is a commodity and may be traded between a seller and a buyer. The computer program product may be distributed in the form of a device-readable storage medium (e.g., compact disc read only memory (CD-ROM)) or online through an application store (e.g., PlayStore™). In the case of online distribution, at least a portion of the computer program product may be stored, or at least temporarily generated, in a storage medium, such as a manufacturer's server, an application store's server, or the memory of a relay server.

In addition, according to an embodiment, the various embodiments described above may be implemented in a computer or a recording medium readable by a computer or a similar device using software, hardware, or a combination of software and hardware. In some cases, the embodiments described in the disclosure may be implemented by a processor itself. According to software implementation, the embodiments such as the procedures and functions described in the disclosure may be implemented by separate software. Each software may perform one or more functions and operations described in the disclosure.

Meanwhile, computer instructions for performing processing operations of a device according to the various embodiment of the disclosure described above may be stored in a non-transitory computer-readable medium. The computer instructions stored in the non-transitory computer-readable medium may allow a device to perform the processing operations of the device according to the various embodiments described above in case that the computer instructions are executed by a processor of the device. The non-transitory computer-readable medium is a medium that stores data on a semi-permanent basis and is readable by a device, as opposed to a medium that stores data for a short period of time, such as a register, a cache, a memory, etc. Examples of the non-transitory computer-readable media include CDs, DVDs, hard disks, Blu-ray disks, USBs, memory cards, and ROMs.

In addition, each of the components (e.g., modules or programs) according to the various embodiments may consist of a single entity or a plurality of entities, and some of the corresponding sub-components described above may be omitted or other sub-components may be further included in the various embodiments. Alternatively or additionally, some of the components (e.g., the modules or the programs) may be integrated into one entity, and may perform functions performed by the respective corresponding components before being integrated in the same or similar manner. Operations performed by modules, programs or other components according to the various embodiments may be executed in a sequential manner, a parallel manner, an iterative manner or a heuristic manner, and at least some of the operations may be performed in a different order or be omitted, or other operations may be added.

Hereinabove, although one or more embodiments of the present disclosure have been shown and described above, the disclosure is not limited to the specific embodiments described above, and various modifications may be made by one of ordinary skill in the art without departing from the spirit of the disclosure as claimed in the claims, and such modifications are not to be understood in isolation from the technical ideas or prospect of the disclosure.

What is claimed is:

1. A display device comprising:

a display;

memory storing instructions; and at least one processor configured to control the display to display a virtual world image including a virtual display device, wherein the instructions, when executed by the at least one processor, cause the display device to:

based on the display device being in a first mode, control the display to display a first virtual world image including the virtual display device where content is displayed; and based on the first mode being changed to a second mode, control the display to crop one or more avatars in the first virtual world image, display at least a portion of an area excluding the virtual display device in the first virtual world image including the cropped one or more avatars in a first area of the display, and to display the content through a second area of the display.

2. The display device as claimed in claim 1, wherein the instructions, when executed by the at least one processor, cause the display device to:

control the display to display only a partial area of an entire area corresponding to the virtual display device based on a first user manipulation; and based on a ratio of the partial area to the entire area being less than a threshold ratio, change the first mode to the second mode.

3. The display device as claimed in claim 1, wherein the first virtual world image further includes a first avatar corresponding to a user of the display device and at least one second avatar corresponding to at least one other user viewing the content with the user, and wherein the instructions, when executed by the at least one processor, cause the display device to, based on the first mode being changed to the second mode, control the display to display the first avatar and the at least one second avatar through the first area, and to display the content through the second area.

4. The display device as claimed in claim 3, wherein the instructions, when executed by the at least one processor, cause the display device to change a shape of the first avatar based on at least one of a remote control signal, a user voice, a keyboard input, or a user gesture.

5. The display device as claimed in claim 1, wherein the instructions, when executed by the at least one processor, cause the display device to, based on the first mode being changed to a third mode, control the display to display the first virtual world image through a third area of the display, and to display other content through a fourth area of the display.

6. The display device as claimed in claim 5, wherein the first virtual world image further includes a first avatar corresponding to a user of the display device and at least one second avatar corresponding to at least one other user viewing the content with the user, and wherein the instructions, when executed by the at least one processor, cause the display device to control the display to display a third avatar corresponding to an additional user viewing the content or the other content with the user, or at least one of photographing images of the additional user through a fifth area of the display, and to display a chat icon for conducting a chat with the at least one other user or the additional user through a sixth area of the display.

7. The display device as claimed in claim 1, further comprising:

a communication interface, wherein the instructions, when executed by the at least one processor, cause the display device to:

receive streaming data through the communication interface;

obtain the content from the streaming data; and render the first virtual world image including the virtual display device where the content is displayed.

8. The display device as claimed in claim 1, further comprising:

a communication interface, wherein the instructions, when executed by the at least one processor, cause the display device to:

based on the display device being in the first mode, receive the first virtual world image from a server through the communication interface, and control the display to display the received first virtual world image.

9. The display device as claimed in claim 8, wherein the instructions, when executed by the at least one processor, cause the display device to:

based on the first mode being changed to the second mode, control the communication interface to transmit a signal requesting information about the content to the server;

based on the information about the content being received through the communication interface, receive streaming data based on the received information; and obtain the content from the streaming data.

10. The display device as claimed in claim 1, wherein the instructions, when executed by the at least one processor, cause the display device to:

based on a user command for viewing the content with other user being received while the content is displayed through the display, provide information for sharing the content to a predetermined user terminal; and based on information about the other user being received, control the display to display the first virtual world image including a first avatar corresponding to a user of the display device, a second avatar corresponding to the other user, and the virtual display device.

11. The display device as claimed in claim 10, wherein the predetermined user terminal includes at least one of a user terminal connected to the same communication network as the display device or a prestored user terminal.

12. A controlling method of a display device, the controlling method comprising:

based on the display device being in a first mode, displaying a first virtual world image including a virtual display device where content is displayed; and based on the first mode being changed to a second mode, controlling the display to crop one or more avatars in the virtual world image, display at least a portion of an area excluding the virtual display device in the first virtual world image including the cropped one or more avatars in a first area of the display, and display the content through a second area of the display.

13. The controlling method as claimed in claim 12, further comprising:

displaying only a partial area of an entire area corresponding to the virtual display device based on a first user manipulation; and based on a ratio of the partial area to the entire area being less than a threshold ratio, changing the first mode to the second mode.

14. The controlling method as claimed in claim 12, wherein the first virtual world image further includes a first avatar corresponding to a user of the display device and at least one second avatar corresponding to at least one other user viewing the content with the user; and wherein the displaying the content through the second area of the display comprises, based on the first mode being changed to the second mode, displaying the first avatar and the at least one second avatar through the first area, and displaying the content through the second area.

15. The controlling method as claimed in claim 14, further comprising:

changing a shape of the first avatar based on at least one of a remote control signal, a user voice, a keyboard input, or a user gesture.

* * * * *